United States Patent
Caroli

(10) Patent No.: US 7,133,616 B2
(45) Date of Patent: Nov. 7, 2006

(54) WAVELENGTH-SELECTIVE ROUTING USING AN OPTICAL ADD/DROP ARCHITECTURE

(75) Inventor: Carl A Caroli, Locust, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 750 days.

(21) Appl. No.: 09/944,877

(22) Filed: Sep. 1, 2001

(65) Prior Publication Data
US 2006/0228114 A1 Oct. 12, 2006

(51) Int. Cl.
*H04J 14/02* (2006.01)
(52) U.S. Cl. .......................... 398/83; 398/79; 398/82; 398/45; 398/46; 398/48; 398/49; 398/50; 398/52; 398/54; 398/55; 398/56; 398/57; 398/58; 398/59; 398/61; 398/62; 398/63; 398/64; 385/24; 385/16; 385/17; 385/18
(58) Field of Classification Search .................. 398/82, 398/83, 79, 45, 48, 49, 59, 46, 50, 52, 54, 398/55, 56, 57, 58, 61, 62, 63; 385/64, 24, 385/16, 17, 18
See application file for complete search history.

(56) References Cited

U.S. PATENT DOCUMENTS

| | | | | |
|---|---|---|---|---|
| 6,101,012 A | * | 8/2000 | Danagher et al. | 398/1 |
| 6,608,709 B1 | * | 8/2003 | Duerksen | 385/24 |
| 6,631,018 B1 | * | 10/2003 | Milton et al. | 398/59 |
| 2001/0040710 A1 | * | 11/2001 | Sharratt et al. | |
| 2002/0159115 A1 | * | 10/2002 | Rumer | |
| 2002/0186432 A1 | * | 12/2002 | Roorda et al. | 359/128 |

* cited by examiner

*Primary Examiner*—Hanh Phan

(57) ABSTRACT

A wavelength-selective routing capability is provided in a single network element by configuring the network element using a combination of add/drop network elements to route individual optical channels of WDM signals among a plurality of optical transmission paths coupled to the network element. Any optical channel of any WDM signal received at the network element can be selectively added, dropped, or routed among the multiple optical transmission paths within and external to the node.

7 Claims, 2 Drawing Sheets

PRIOR ART

WAVELENGTH-SELECTIVE ROUTING USING AN OPTICAL ADD/DROP ARCHITECTURE

TECHNICAL FIELD

The invention relates generally to optical communication systems employing wavelength division multiplexing (WDM) and, more particularly, to selectively routing individual optical channels at a network element in such optical communication systems.

BACKGROUND OF THE INVENTION

Optical fiber is fast becoming a transmission medium of choice for many communication networks because of the speed and bandwidth advantages associated with optical transmission. In addition, WDM is used to meet the increasing demands for more capacity in optical communication networks. As is well known, WDM combines many optical channels each at a different wavelength for simultaneous transmission as a composite optical signal in a single optical fiber.

Management of this increased capacity in WDM systems, e.g., managing the routing of communications traffic in many different optical channels on a wavelength-by-wavelength basis, is an important aspect of many WDM-based communication networks. For example, a desirable feature for many WDM networks is the capability to change routing of traffic among the different optical channels at certain nodes in the network to accommodate different users' requirements or changing requirements of a particular user. Certain types of network elements are deployed in WDM networks for such purposes. By way of example, cross-connects, add/drop multiplexers, optical switching arrangements, and the like are used at nodes in a WDM network to change the routing of individual optical channels (e.g., via cross-connections), to add or drop selected optical channels at particular nodes, and so on.

FIG. 1 shows one exemplary node 100 in a typical WDM network that is interconnected to many other nodes (not shown) by respective WDM optical line systems 101–104 via transmission paths 111–114. Although node 100 is shown in simplified form, it is assumed for this example that each of optical line systems 101–104 supports bi-directional communication via paths 111 114, wherein multiple optical fibers may be employed for such purpose. As such, it is also assumed that each of transmission paths 111–114 carries one or more WDM signals each having a number of optical channels.

In a so-called large node configuration, for example, node 100 might typically include a network element such as cross-connect 120 to switch or otherwise route traffic carried by individual optical channels of the WDM signals from one transmission path to another. For example, cross-connect 120 might be used to route communications traffic from an optical channel in the incoming WDM signal on path 111 to an optical channel in the outgoing WDM signal on path 114. Various cross-connect network elements employing either electronic, optical, or other switching fabrics are known to those skilled in the art. In general, these cross-connects are typically very costly and add a significant amount of complexity at a given node in the network. As such, cross-connects are generally reserved for use at the so-called larger network nodes. Add/drop multiplexers and other less costly and less complex network elements are typically found in the other network nodes that provide some limited routing functionality. However, these types of network elements are generally only used for managing a subset of the total number of optical channels that are being dropped and added in the WDM signal being processed at that node.

Accordingly, it would be desirable to provide a lower cost and more robust wavelength-selective routing capability at nodes in a WDM network that do not have a cross-connect network element or the like.

SUMMARY OF THE INVENTION

A robust wavelength-selective routing capability is provided in a single network element according to the principles of the invention by configuring the network element using a combination of add/drop network elements to route individual optical channels of WDM signals among a plurality of optical transmission paths coupled to the network element. In this manner, any optical channel of any WDM signal received at the network element can be selectively added, dropped, or routed among the multiple optical transmission paths within and external to the node.

In one illustrative embodiment, a network element is configured as a so-called mesh node and is coupled to each of a plurality of optical transmission paths via a respective interface, wherein each optical transmission path carries a WDM signal having a plurality of optical channels. By way of example only, each of the transmission paths may be coupled to another node in the WDM network via one or more optical fibers. At each interface in the network element, an add/drop routing element is provided for receiving the respective WDM signal, selectively dropping individual optical channels at the network element, selectively adding individual optical channels for transmission with other optical channels on any of the transmission paths via a respective interface, and for selectively routing individual optical channels to any of the other interfaces for transmission in any of the other respective transmission paths. In one exemplary embodiment, the add/drop routing element includes an optical distributor portion for receiving a respective WDM signal, dropping selected optical channels from the WDM signal, and selectively routing the remaining optical channels to one of the other interfaces. The add/drop routing element also includes an optical combiner portion for adding individual optical channels to the WDM signal and for combining the optical channels being added with optical channels supplied from one or more other add/drop routing elements associated with the other interfaces.

According to the principles of the invention, both a wavelength-selective routing function as well as an optical add/drop function is therefore provided in a single network element that is connected to a plurality of optical transmission paths. By using an add/drop architecture to provide both routing and add/drop capabilities, a solution is therefore provided for use at nodes that do not have a cross-connect switch. Moreover, costly transponders that would otherwise be used at a node to interface to multiple optical line systems and transmission paths are not needed.

BRIEF DESCRIPTION OF THE DRAWINGS

A more complete understanding of the present invention may be obtained from consideration of the following detailed description of the invention in conjunction with the drawing, with like elements referenced with like reference numerals, in which.

DETAILED DESCRIPTION

Figure 1:
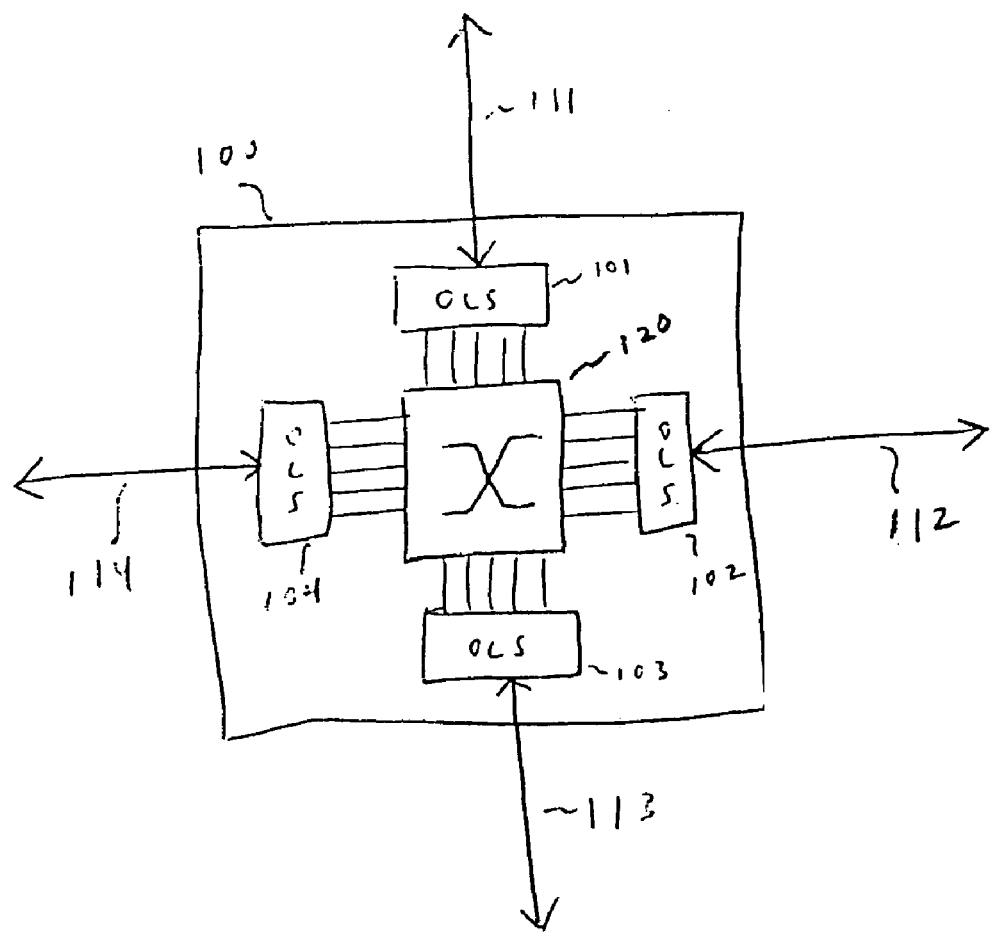
FIG. 1 shows a simplified block diagram of a typical network node employing an optical cross-connect for routing optical channels among a plurality of transmission paths coupled to the node.
Figure 2:
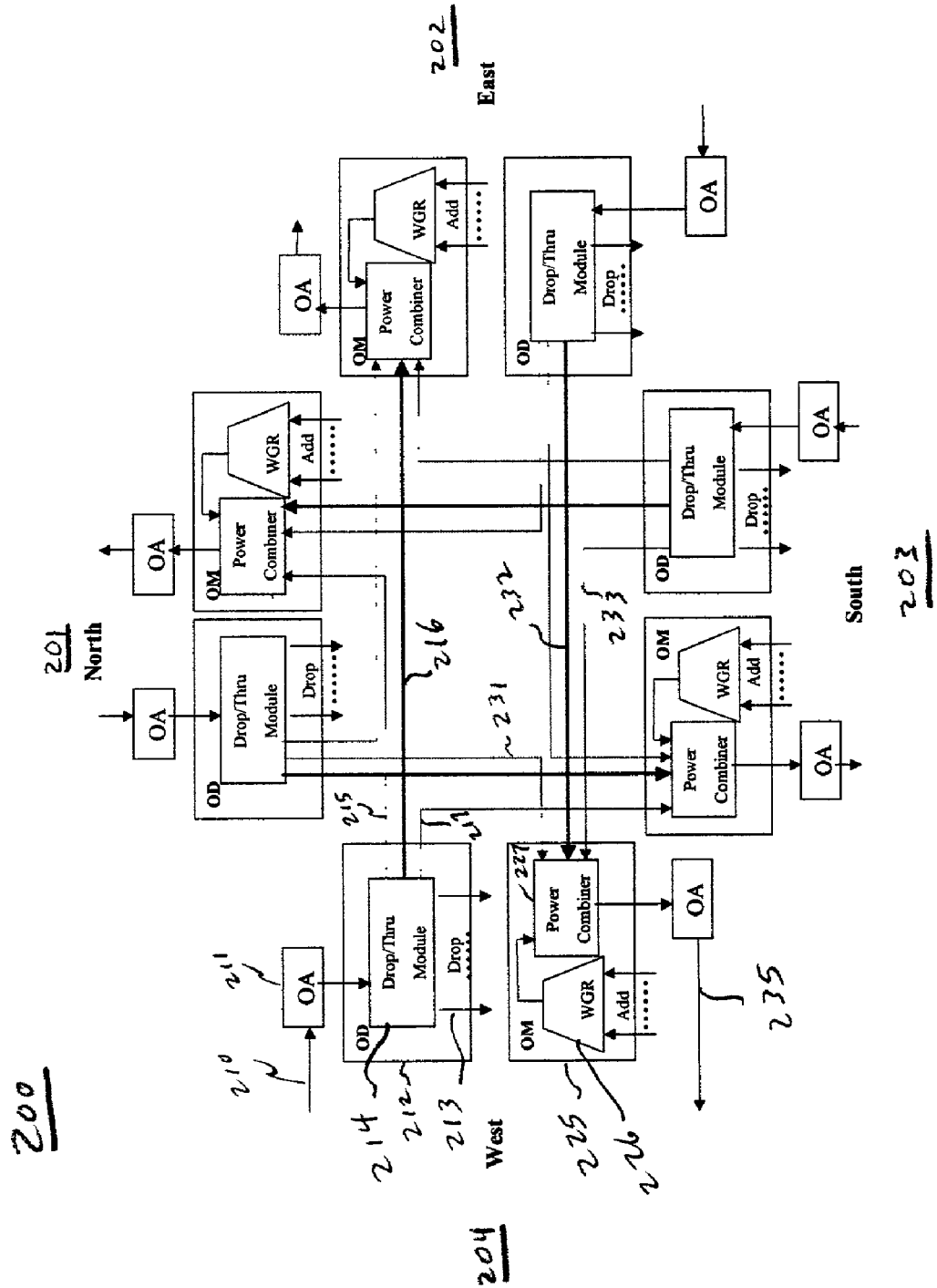
FIG. 2 is a simplified block diagram of one illustrative embodiment of the invention.

FIG. 2 shows a simplified block diagram of a network element according to one illustrative embodiment of the invention. As shown, network element 200 includes four interfaces 201–204, labeled for simplicity as North, East, South, and West respectively. Each of interfaces 201–204 includes the same elements and, as such, only interface 204 and its associated elements will be described in detail for sake of brevity. Accordingly, only interface 204 includes reference numerals for simplicity of illustration.

Interface 204 receives an incoming WDM signal via optical transmission path 210. Optionally, optical amplifier 211 can be used to amplify the WDM signal in a conventional manner. The need for amplification and different amplification schemes will be apparent to those skilled in the art and are a matter of design choice based on factors such as required signal levels, loss "budget" for the system, nodes, and so on.

At interface 204, the amplified optical signal is supplied to an add/drop routing element that comprises an optical distributor portion 212 and an optical combiner portion 225. More specifically, the WDM signal is supplied to optical distributor portion 212 which may include, among other components, optical demultiplexer 214. Optical demultiplexer 214 separates the WDM signal into its individual optical channels, e.g., wavelength channels. Many commercially available devices can be used to provide the demultiplexing function of optical demultiplexer 214. By way of example, an arrayed waveguide grating (AWG), commonly referred to as a waveguide grating router (WGR), is one such optical demultiplexer although there are numerous other devices that are suitable for extracting one or more optical channels of particular wavelengths from a WDM signal. For example only, other devices include, but are not limited to, thin film filters, grating-based arrangements, and so on.

At the output of optical demultiplexer 214, individual optical channels can be dropped via intra-node transmission path 213. Other components needed for extracting the optical channels to be dropped are not shown here, e.g., filters, receivers, and so on, however, various well-known techniques and components are suitable for dropping selected ones of optical channels from the demultiplexed WDM signal. The selective dropping of particular optical channels can be controlled via standard control techniques used in WDM systems having add/drop elements, e.g., messaging and commands via system and board-level controllers, supervisory channels, and so on.

The optical channels that are not dropped at interface 204 in network element 200 are selectively routed to any of the other interfaces 201–203 via intra-node transmission paths 215–217, respectively. Again, the selective routing of particular optical channels via intra-node transmission paths 215–217 can be controlled via standard control techniques used in WDM systems having add/drop elements, e.g., messaging and commands via system and board-level controllers, supervisory channels, and so on.

It will be appreciated by those skilled in the art that a typical arrangement in WDM systems for dropping individual channels from a WDM signal might employ a scheme whereby an incoming WDM signal is separated into two paths (e.g., via a splitter, interleaver, and the like). One of the two paths could then be used for normalized through routing, also commonly referred to as "express" routing. Optical channels in this path would not be capable of being dropped. In the other path, the optical channels could either be dropped or routed through to be combined again with the channels being expressly routed in the other of the two paths.

By contrast, the optical distributor portion 212 in the present embodiment shown in FIG. 2 would require an optical demultiplexing capability or suitable alternative arrangement that is capable of receiving a single incoming WDM signal and routing the WDM signal and/or individual optical channels in the WDM signal in one of four different ways. In particular, one signal or group of signals would be routed for drop via path 213, while the other three groups of signals (e.g., optical channels) would be selectively routed to one or more of the three other interfaces 201–203. As such, it is contemplated in one illustrative embodiment that such an optical distributor arrangement would be configured with additional components to allow for independent optical switching of the individual optical channels to each of the intra-node transmission paths 213 and 215–217. By way of example only, a 1×4 optical switch could be employed for each of the optical channels to facilitate routing among the various paths.

Alternatively, another design alternative could employ the "express" routing technique described above whereby one of the intra-node transmission paths, e.g., path 216, would be used to expressly route selected ones of the optical channels in the incoming WDM signal from interface 204 to interface 202, by way of example. The remaining optical channels not being expressly routed via path 216 could either be dropped at interface 204 or not dropped and routed onto one of the intra-node transmission paths 215–217. For example, those optical channels in this category that are to be routed to interface 202 could be recombined with the optical channels being expressly routed to interface 202. Other alternatives will be apparent to those skilled in the art. It should also be noted that various technologies, now known or later developed, are contemplated for use in optical distributor portion 212. By way of illustration and not of limitation, such technologies might include micro-electromechanical systems (MEMS) and so on.

Interface 204 further includes an optical combiner portion 225, which may include, among other elements, a waveguide grating router (WGR) 226 and an optical power combiner 227. WGRs and power combiners are well-known, commercially available devices. Other suitable devices may also be used for adding one or more optical channels of particular wavelengths to a WDM signal and will be apparent to those skilled in the art. In the present embodiment, WGR 226 is used for adding selected optical channels to the WDM signal at interface 204 in network element 200. Other components needed for inserting the optical channels to be added are not shown here, e.g., transmitters and so on. The selective adding of particular optical channels can be controlled via standard control techniques used in WDM systems having add/drop elements, e.g., messaging and commands via system and board-level controllers, supervisory channels, and so on.

Power combiner 227 receives multiple inputs including the optical channels being added via WGR 226 at interface 204 as well as the optical channels being routed to interface 204 from the other interfaces 201–203 via intra-node transmission paths 231–233 respectively. Power combiner 227 then combines the optical channels for transmission as a composite WDM signal from interface 204 via path 235.

It will be appreciated by those skilled in the art that a typical power combiner operates to combine two inputs to generate a single output signal. As such, the embodiment shown in FIG. 2 would require a power combiner arrangement or suitable alternative arrangement that is capable of combining signals from four sources. That is, a first signal or group of signals representing the optical channels being added at interface 204 (e.g., via WGR 226), as well as three other signals or groups of signals representing the optical channels being routed to interface 204 from each of the other interfaces 201–203.

As described, the add/drop routing elements in each of the other interfaces 201–203 would operate in a similar manner as described above for interface 204. By interconnecting multiple add/drop routing elements via multiple intra-node transmission paths between multiple interfaces 201–204, network element 200 effectively operates as a so-called mesh node whereby multiple WDM signals can originate from and be received by network element 200 and whereby individual optical channels from any one of the WDM signals can be routed to and combined with any one of the other WDM signals in accordance with the principles of the invention. Moreover, add/drop principles and add/drop components are used to provide this robust routing capability. As such, an add/drop capability is therefore provided at each of the interfaces so that any of the individual optical channels received by a particular interface can be dropped and any individual optical channel can be added at the respective interface. Consequently, network element 200 provides a wavelength-selective routing capability as well as an add/drop capability at a single node that allows for interfacing to a plurality of optical line systems without the need for a large scale cross-connect and the like.

According to another aspect of the invention, a control and monitoring arrangement would be used to control which optical channels are to be added and/or dropped at network element 200 as well as the selection of appropriate routing paths, e.g., intra-node transmission paths, for those optical channels being routed from interface 204 to one or more of the other interfaces 201–203. Among other functions to be carried out by such a control and monitoring arrangement, a remote provisioning feature is contemplated as well as a collision-avoidance feature to prevent signal collisions with optical channels having the same wavelengths in the various add, drop, and intra-node transmission paths. This control and monitoring arrangement could be software-based in one illustrative embodiment.

The foregoing embodiments are merely illustrative of the principles of the invention. Those skilled in the art will be able to devise numerous arrangements, which, although not explicitly shown or described herein, nevertheless embody those principles that are within the scope of the invention. By way of example only, it is contemplated that some of the teachings in U.S. patent application Ser. No. 09/896,248 entitled "Wavelength-Selective Add/Drop Arrangement for Optical Communication Systems" would be applicable, consistent with the teachings herein, in deriving other alternative arrangements for performing the functions of optical distributor portion 212 and optical combiner portion 225. Other substitutions and modifications will also be apparent to those skilled in the art in view of well-known network and system design principles and further in view of the teachings herein and, as such, are contemplated for use according to the principles of the invention. Accordingly, the embodiments shown and described herein are only meant to be illustrative and not limiting in any manner. The scope of the invention is limited only by the claims appended hereto.

I claim:

1. A network element coupled to a plurality of optical transmission paths via respective interfaces, wherein each optical transmission path carries a wavelength division multiplexed (WDM) signal having a plurality of optical channels, the network element comprising:
   at each interface, an add/drop routing element for receiving a WDM input signal, for selectively dropping individual optical channels from the WDM input signal at the network element, for selectively adding individual optical channels for transmission in a WDM output signal, each interface comprising a plurality of intra-node outputs for selectively routing individual optical channels from the WDM input signal to one or more of a plurality of the other interfaces for transmission in any of the plurality of optical transmission paths.

2. The network element according to claim 1, wherein the add/drop routing element includes:
   an optical distributor portion adapted for receiving the WDM input signal, for dropping selected optical channels from the WDM input signal, and for selectively routing remaining optical channels to one of the other interfaces; and
   an optical combiner portion adapted for adding individual optical channels to the WDM output signal and further adapted for receiving and combining optical channels supplied from one or more other add/drop routing elements associated with other interfaces with the individual optical channels being added to generate the WDM output signal.

3. The network element according to claim 2, wherein individual optical channels are capable of being selectively routed among any of the plurality of optical transmission paths via the respective interfaces.

4. The network element according to claim 2, wherein the optical distributor portion includes an optical demultiplexer operable to separate individual optical channels in the WDM input signal so that selected optical channels can be dropped from the WDM input signal and so that individual optical channels not being dropped can be routed to one or more interfaces associated with each of the other plurality of optical transmission paths.

5. The network element according to claim 2, wherein the optical combiner portion includes:
   an optical multiplexer operable to selectively add individual optical channels at a respective interface; and
   an optical combiner for combining the optical channels being added at the respective interface with optical channels supplied from the one or more other add/drop routing elements associated with the other interfaces.

6. A method of selectively routing individual optical channels of a wavelength division multiplexed (WDM) signal at a node having a plurality of optical interfaces each coupled to a respective optical transmission path, the method comprising:
   receiving a WDM input signal at a first optical interface;
   selectively dropping individual optical channels from the WDM input signal at the first optical interface;
   selectively routing individual optical channels not being dropped at the first optical interface over a plurality of intra-node transmission paths to one or more of the other plurality of optical interfaces via a respective intra-node optical transmission path; and combining individual optical channels being added to a WDM output signal at the first optical interface with optical channels received from the other of the plurality of optical interfaces via the respective intra-node optical transmission paths for transmission as a WDM output signal from the node, wherein individual optical channels are capable of being selectively routed among the plurality of optical transmission paths via the plurality of optical interfaces.

7. A node having a mesh topology for selectively routing individual optical channels of a wavelength division multiplexed (WDM) optical signal, wherein the node is coupled to a plurality of optical transmission paths via respective interfaces, the node comprising:

a plurality of add/drop routing elements each coupled to one of the plurality optical transmission paths, wherein each of the plurality of add/drop routing elements includes:

an input for receiving a WDM input signal, an optical router for dropping selected optical channels from the WDM input signal and for selectively routing optical channels not being dropped via a plurality of intra-node transmission paths to one or more other add/drop elements in the node, an optical combiner coupled to each of the one or more intra-node transmission paths for receiving and combining optical channels being added at the node with optical channels supplied from the one or more other add/drop elements in the node, and an output for generating a WDM output signal comprising optical channels supplied from any of the plurality of add/drop elements and optical channels being added at the node.

* * * * *